(12) United States Patent
Hartleb et al.

(10) Patent No.: US 12,530,065 B2
(45) Date of Patent: Jan. 20, 2026

(54) MOBILE AND MODULAR COMMUNICATION AND DATA PROCESSING DEVICE WITH COMPUTER FUNCTIONALITY

(71) Applicant: ECOM Instruments GmbH, Assamstadt (DE)

(72) Inventors: Joerg Hartleb, Assamstadt (DE); Roolf Wessels, Weikersheim (DE)

(73) Assignee: ECOM INSTRUMENTS GMBH (DE)

( * ) Notice: Subject to any disclaimer, the term of this patent is extended or adjusted under 35 U.S.C. 154(b) by 287 days.

(21) Appl. No.: 18/019,791

(22) PCT Filed: Aug. 5, 2021

(86) PCT No.: PCT/EP2021/071927
§ 371 (c)(1),
(2) Date: Feb. 3, 2023

(87) PCT Pub. No.: WO2022/029258
PCT Pub. Date: Feb. 10, 2022

(65) Prior Publication Data
US 2025/0181128 A1    Jun. 5, 2025

(30) Foreign Application Priority Data
Aug. 6, 2020 (DE) .................. 10 2020 210 006.3

(51) Int. Cl.
*G06F 1/26* (2006.01)
*G06F 1/16* (2006.01)
(Continued)

(52) U.S. Cl.
CPC ............... *G06F 1/26* (2013.01); *G06F 1/163* (2013.01); *G06F 1/1632* (2013.01); *G06F 3/048* (2013.01);
(Continued)

(58) Field of Classification Search
CPC ............ G06F 2218/22; G06F 3/04842; G06F 3/04817; G06F 1/1632; G06F 21/31;
(Continued)

(56) References Cited

U.S. PATENT DOCUMENTS

2004/0233930 A1* 11/2004 Colby, Jr. ........... H04W 12/069 370/464
2015/0074541 A1* 3/2015 Schwartz ............. G06F 3/0482 715/740
(Continued)

*Primary Examiner* — Terrell S Johnson
(74) *Attorney, Agent, or Firm* — Fishman Stewart PLLC

(57) ABSTRACT

A device may include a data processing unit, at least one wireless communication interface, at least one wired communication interface, a supply connection, and a rechargeable battery store. The data processing unit may be configured to run a computer program product. The at least one wireless communication interface may be communicatively coupled with the data processing unit to establish a wireless communication connection between the data processing unit and at least one external peripheral component. The at least one wired communication interface may be communicatively coupled with the data processing unit to establish a wired communication connection between the data processing unit and at least one external peripheral component or an external network. The supply connection may be configured for connection with an external electrical power supply to supply at least the data processing unit with external electrical energy. The rechargeable battery store may be for storing electrical energy.

16 Claims, 1 Drawing Sheet

(51) Int. Cl.
 *G06F 3/048* (2013.01)
 *G06F 3/04817* (2022.01)
 *G06F 3/04842* (2022.01)
 *G06F 3/14* (2006.01)
 *G06F 21/31* (2013.01)
 *G06F 21/62* (2013.01)

(52) U.S. Cl.
 CPC ...... *G06F 3/04817* (2013.01); *G06F 3/04842* (2013.01); *G06F 3/1423* (2013.01); *G06F 21/31* (2013.01); *G06F 21/62* (2013.01); *G06F 21/629* (2013.01); *G06F 2218/22* (2023.01)

(58) Field of Classification Search
 CPC ........ G06F 21/62; G06F 21/629; G06F 3/048; G06F 3/1423
 See application file for complete search history.

(56) References Cited

U.S. PATENT DOCUMENTS

2015/0111612 A1* 4/2015 Yaghmour ............ G06F 1/1632
 455/557
2016/0106370 A1 4/2016 Filipovic

* cited by examiner

MOBILE AND MODULAR COMMUNICATION AND DATA PROCESSING DEVICE WITH COMPUTER FUNCTIONALITY

CROSS-REFERENCE TO RELATED APPLICATIONS

This application claims priority to International Patent Application No. PCT/EP2021/071927, filed on Aug. 5, 2021, and German Patent Application No. DE 10 2020 210 006.3, filed on Aug. 6, 2020, the contents of both of which are hereby incorporated by reference in their entirety.

TECHNICAL FIELD

The present invention relates to a mobile, modular communication and data processing device with computer functionality, in particular a device which can be worn or carried on the body by a user. The invention relates further to an assembly including such a device and with at least one peripheral component which is or can be brought into communication connection with the device.

BACKGROUND

"Smart devices" such as smartphones, smartwatches or tablet computers—also called "device" in the following—are typically equipped with many functions which are defined for the purposes of a specific application. Such a device type is based on a standardised processor platform with an operating system optimised for the platform. The device architecture is configured to provide highly integrated, multifunctional devices designed particularly for the multi- and social media environment.

However, the high integration density of the conventional smart device is associated with a number of disadvantages for the user. In particular, functionalities are often provided that in practice are not needed by the user at all. The unused and unwanted functionalities lead to unnecessary costs for the user when purchasing the smart device, since the device would be less expensive to produce without these functionalities. Moreover, both the net weight and energy consumption of the device typically increase with the number of functions, which is also unfavourable for a mobile device.

In the field of the commercial and industrial use of smart devices, for example, existing multimedia properties of the device are used for "Augmented Reality" applications. But the device's display can also be used to show process data or for editing checklists.

However, different disadvantages are created by the various application fields depending on the device type concerned. Thus for example, the display of the device may be too small to allow certain processes to be shown. On the other hand, for certain applications a display might not be needed at all.

As was explained previously, conventional smart device are therefore optimised for different applications. Conversely, this means that a user needs several smart device of different types or different models for different applications, from which he can choose the most suitable device for the application needed at the time. But buying multiple smart devices is expensive. Furthermore, in practice the user must carry the smart device that are available for selection with him, which can entail disadvantages with regard to considerations not just of cost and weight.

SUMMARY

The task of the present invention is therefore to provide an improved embodiment of a smart device, in which the drawbacks described above are addressed.

This task is solved by the subject matter of the independent claim(s). Preferred variants thereof are described in the dependent claim(s).

Accordingly, the fundamental idea of the invention is to design a smart device which is portable by the user, and to create said device with a central communication and data processing device, hereinafter abbreviated to "device", and various input and output devices—also referred to as "peripheral devices" or "peripheral components" in particular connected wirelessly or by wire therewith—, which may be connected to the central communication and data processing device and disconnected from it again as necessary, in particular depending on the application concerned.

For this purpose, the device may include a control and storage unit similarly to a conventional portable computer. Data may be stored in the storage unit in conventional manner and may be processed by the control unit. Thus, the device may have the same functionality as a conventional portable computer in terms of data processing and data storage.

In this context, the user of the device, that is to say the user of the smart device according to the invention, can then carry the appropriate peripheral component depending on the intended application and then also lighter peripheral equipment with him, and connect it to the device. On the other hand, peripheral equipment which is not needed may be left behind. This yields advantages in terms of power supply to the smart device, since peripherals do not have to be supplied with electrical energy from the device. In addition the user does not have to carry unnecessary weight.

The peripheral equipment that is carried may be distributed over the body, in particular on various items of clothing worn by the user. This is found to be advantageous particularly—but not only—when the peripheral equipment is connected to the device wirelessly. This makes it easier to carry the mobile smart device on a person's body and increases the comfort associated with wearing the smart device because the total weight thereof is distributed about the body.

Regardless of the combination of device and peripheral components chosen for carrying in a specific individual case, the smart device according to the invention allows an application-specific selection of the peripheral components needed for subsequent practical applications even at the time the device is purchased. For example, if the user does not need a display for any of his planned applications, he can avoid the expense of buying the corresponding peripheral components.

Further advantages are also derived besides the benefits of the solution according to the invention obtained directly by the user, as explained previously. Due to the modular construction of the smart device, the further technical development of the device and even the further technical development of the individual peripheral components may be carried out at least partly independently of each other. This Means that the technical "evolution" of the entire smart device can advance more quickly than in the case of a conventional, non-modular system. Since the product life-cycle of the peripheral is longer than that of the smart device, the user keeps possession of a device that reflects the latest state of technical progress for longer. This enables users to remain abreast of technical progress for less expense. Furthermore, the costs of continued development fall over time.

Consequently, the modular approach for a smart device presented here makes it possible optimise it in many respects with regard to the application(s) demanded by the mobile user.

A mobile modular communication and data processing device with computer functionality (device) according to the invention comprises a housing which encloses a housing interior. A data processing unit is arranged inside the housing interior, and in turn is equipped with a control unit and a storage unit. The storage unit may serve to store data which may be executed by the control unit. Thus, the device is able to run a computer software product (i.e. "software code"), in particular a software operating system.

In addition, at least one wireless communication interface in communication connection with the data processing unit is provided in order to establish a wireless communication connection between the data processing unit and at least one external peripheral component. Also, at least one wired communication interface in communication connection with the data processing unit is provided in order to establish a wired communication connection between the data processing unit and at least one external peripheral component and/or an external network. The device further comprises a supply connection which can be connected to an external electrical supply for in order to supply at least the data processing unit with externally supplied electrical energy. Finally, the device comprises a rechargeable battery store for storing electrical energy at least for the data processing unit.

According to a preferred variant, the device includes a user interface which at is at least conformed on the housing and is in communication connection with the data processing unit to enable user interaction. This allows the user of the device to control the device and communicate with it easily.

The user interface particularly advantageously comprises a display device provided on the housing, by means of which at least one parameter that characterizes the operating state of the device, in particular of the data processing unit is or can be displayed.

This at least one parameter is expediently characterized by one or more of the following operating states: a) a communication connection of the device with at least one peripheral component; b) a communication connection of the device or the data processing unit with an external network; c) a current charge status of rechargeable battery store; d) a network connection of the device with an external network. Of course, other parameters of interest may also be displayed. In principle, that parameters may be defined depending on the specific application.

According to an advantageous further development, the user interface comprises an input arrangement provided on the housing, via which the data processing unit and therewith the communication and data processing device may be controlled by the user with corresponding inputs.

According to an advantageous further development, the input arrangement comprises at least one actuation element that is configurable by the user, so that an input signal is generated by actuating the actuation element, which input signal is transmittable to the data processing unit from the input arrangement. The actuation element may be embodied in the manner of a conventional key, which may be arranged on the outside of the housing, such that it can be actuated conveniently by the user when carrying the smart device on his body.

The wireless communication interface may particularly preferably be or comprise a WLAN and/or Bluetooth Interface. Alternatively or in addition thereto, the wired communication interface may be or comprise an Ethernet interface. Such a wireless communication interface provides a capability to simply exchange data with the device, that is to say to transmit data to or from said device.

The computer software that can be run by the device and/or the software operating system that can be run by the data processing unit is particularly preferably configured such that it controls the communication between the device and the at least one peripheral component in communication connection therewith.

The invention relates further to an assembly with a mobile modular communication and data processing device having computer functionality (device) according to the invention, as presented previously, that is to say a smart device as explained previously. The advantages described previously are therefore also transferred to assembly according to the invention. This assembly comprises at least one peripheral component, which is in communication connection with the data processing unit via the wireless communication interface or via the wired communication interface.

According to a preferred variant, the assembly comprises a fixed position data processing system which may be connected, in particular wirelessly or by means of a wire, to the modular communication and data processing device for the transmission of data. The data processing system is designed to be stationary, i.e. it is not portable by the user of the communication and data processing device or mobile, that is to say it is not designed to be carried on the user's body, but instead for operation from a fixed position. The data processing system may be equipped with functions that are of no importance or of significantly less importance for the device. This enables the construction of the device to be particularly compact.

The at least one peripheral component particularly preferably is or comprises an autonomous or a non-autonomous display, in particular a touch display or E-Ink display, and/or a smart glass and/or a smartwatch and/or a camera and/or a loudspeaker and/or an audio-oral system, preferably with a microphone provided on the outside of the housing, and/or a sensor system with at least one sensor for capturing sensor data, preferably a position sensor, and/or an antenna and/or an "energy harvesting" system.

Further important features and advantages of the invention are may be discerned from the subordinate claims, the drawing and the associated drawing description with reference to the drawing.

Of course, the features identified in the preceding text as well as those that will be explained in the following text are usable not only in the respectively described combination, but also in other combinations or alone, without departing from the scope of the present invention.

Preferred embodiments of the invention are represented in the drawing and will be explained in greater detail in the following description.

DETAILED DESCRIPTION

Figure 1:
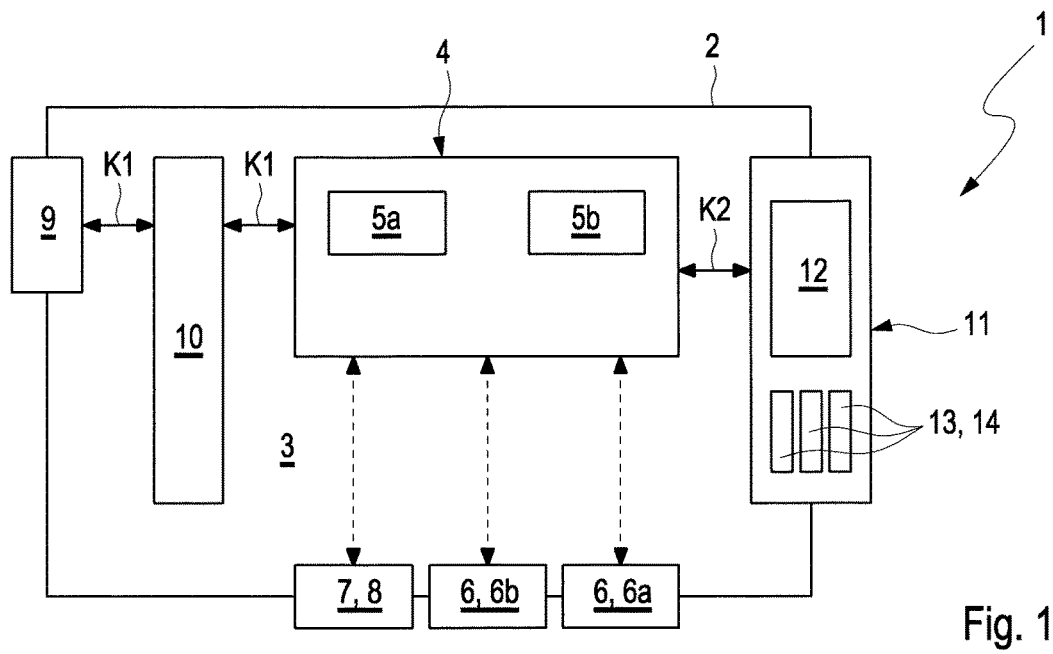
FIG. 1 is a schematic representation explaining an exemplary layout of a device according to the invention.

FIG. 1 shows a highly schematic representation of the layout of a communication and data processing device 1 with computer functionality "device") according to the invention. The device 1 designed in modular form and constructed so as to be portable on the body. For this purpose, the device 1 comprises a housing 2 which encloses a housing interior 3. The housing 2 is dimensioned and designed in such manner that it is possible for a user to carry the device 1 on his body. For this purpose, the housing 2 is in particular dimensioned such that it can be accommodated comfortably in the clothing worn by the user.

A data processing unit 4 comprising a control unit 5*a* and a storage unit 5*b* is arranged in the housing interior 3. A computer software product, that is to say software code, is executable by the data processing unit 4. In particular, operating system software and application-specific software may be run by the data processing unit 4. By means of the data processing unit 4, the device 1 thus provides the functionality of a computer. The device 1 also comprises two wireless communication interfaces 6 in communication connection with the data processing unit 4 for establishing a wireless communication connection between the data processing unit 4 and one or more external peripheral components not shown in FIG. 1. One of the two wireless communication interfaces 6 in the example of the figures is a Bluetooth interface 6*a*, the other interface 6 is a WLAN interface 6*b*.

The device 1 additionally comprises a wired communication interface 7 which is in communication connection with the data processing unit 4 for establishing a wired communication connection between the data processing unit 4 and an external peripheral component which is also not shown in FIG. 1. The wired communication interface 7 in the example of the figures is an Ethernet interface 8.

An electrical supply connection 9 that can be connected to an external energy supply (not shown) is arranged on housing 2. The electrical supply connection 9 serves to supply the data processing unit 4 with external electrical energy, and it is connected electrically therewith for this purpose (see arrow K1 in FIG. 1). A rechargeable battery store 10 which may be connected electrically both to the supply connection 9 and to the data processing unit 4 is also provided in the housing interior 3. The battery store 10 serves to store electrical energy, which is available for operating the device 1, in particular the data processing unit 4, while the device 1 or the data processing unit 4 is not connected to the external power supply.

As FIG. 1 illustrates schematically, the device 1 may include a user interface 11 which is conformed partly on the housing 2, via which the data processing unit 4 can be controlled by the user of the device 1. For this purpose, the user interface 11 is in communication connection with the data processing unit 4 (see K2 in FIG. 1).

For the purpose of user interaction, the user interface 11 may comprise a display device 12 provided on the outside of the housing 2. Various parameters characterizing the current operating state of the device 1 or the data processing unit 4 may be displayed by means of the display device 12. The user interface 11 may comprise an input arrangement 13 provided on the outside of the housing 2, via which the data processing unit 4 can be controlled by the user.

The aforementioned parameter may characterize one or more operating states of the device 1. In particular, the parameter may characterize a communication connection of the device 1 with one or more of the peripheral components 21. The parameter may equally characterize a communication connection of the device 1 or data processing unit 4 with an external network with which the device 1 communicates via the Ethernet interface 8. The parameter may otherwise characterize a current charge state of the rechargeable battery store.

The input arrangement 13 in turn may include one or more actuation elements 14—for example in the form of a key that can be pressed, in such manner than when a certain actuation element 14 is actuated an input signal is generated which may be transmitted to the data processing unit 4 from the input arrangement 13 to control the data processing unit 4.

Figure 2:
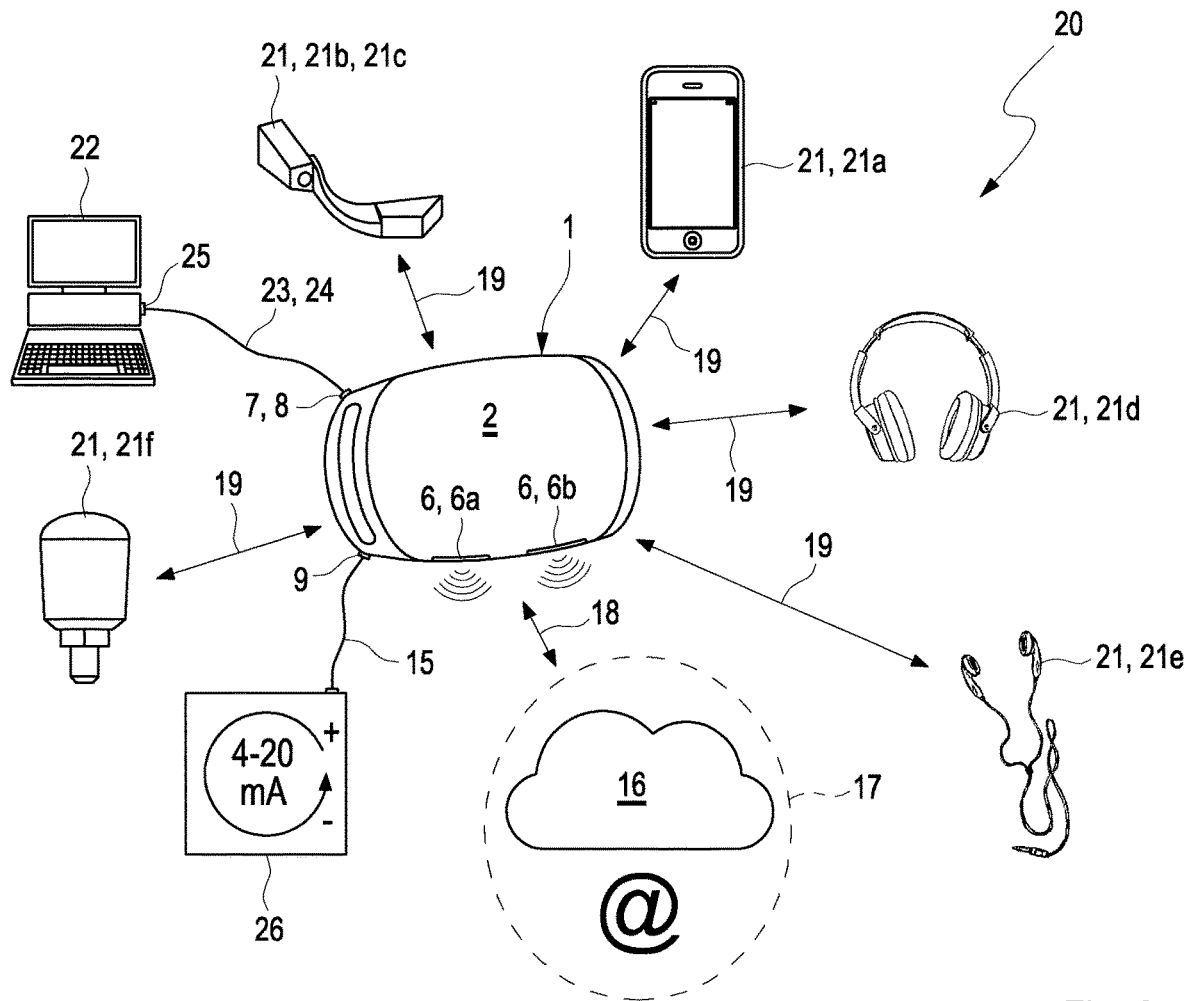
FIG. 2 is a schematic representation illustrating the various peripheral components that can be connected to the device.

FIG. 2 illustrates the connection of various peripheral components with the device 1 via communication connection between the respective peripheral component and the data processing unit 4 via the wireless communication interface 6 and/or the wired communication interface 7.

In the example of FIG. 2, such an assembly 20 comprises the communication and data processing device 1 and a plurality of peripheral components 21, which are in communication connection with the data processing unit 4 via the wireless communication interface 6 or via the wired communication interface 7.

FIG. 2 illustrates which peripheral component 21 may be connected for example. For exemplary purposes, FIG. 2 shows an autonomous or non-autonomous display 21*a*, which may be for example a touch display or an E-Ink display.

Alternatively or in addition thereto, the use of a "smart glass" 21*b* or a smartwatch 21*c* would be conceivable. Use of a camera (not shown) as well as a microphone 21*f*, a loudspeaker 21*d*—in the form of headphones 21*d* in the example of FIG. 2 and an audio-oral system 21*e* is also conceivable. In the example of FIG. 2, all of the peripheral component 21 identified are connected—to the wireless communication interface 6 or the Bluetooth interface 6*a*—of the device 1 via a wireless communication connection represented schematically in FIG. 2 by arrows identified with the reference numeral 19. A further wireless communication interface 6, in the form WLAN interface 6*b*, connects the device 1 via a WLAN communication connection 18 to the Internet 17, where cloud services 16 are provided.

The electrical supply connection 9 may typically be connected to an external electrical power supply 26 via an electric charging cable 15 for charging the electrical battery store 10.

As suggested in the example of FIG. 2, the assembly 20 may include a stationary data processing system 22 which may be connected to the modular communication and data processing device 1 by wireless or wired means for the transmission of data. In the example of FIG. 2, the stationary data processing system 22 communicates with the wired communication interface 7 via a wired Ethernet connection 23 which comprise—an Ethernet cable 24. Such a wired communication interface is also provided on the stationary data processing system 22, where it is designated with reference numeral 25.

At the stationary data processing system 22, data for further processing by the device 1 may be transmitted to the data processing unit 4 of device 1 and vice versa.

The software operating system executable by the data processing unit 4 is configured in such manner that it controls, in particular prioritises the communication of the data processing unit with the peripheral component which are in communication connection therewith.

The invention claimed is:
1. A device, comprising:
a housing;

a data processing unit disposed within the housing and including a control unit and a storage unit that are configured to run a computer program product;

at least one wireless communication interface disposed within the housing and in communication connection with the data processing unit to establish a wireless communication connection between the data processing unit and at least one external peripheral component of a plurality of connectable external peripheral components;

at least one wired communication interface disposed within the housing and in communication connection with the data processing unit to establish a wired communication connection between the data processing unit and at least one of the plurality of connectable external peripheral component or an external network;

a supply connection disposed within the housing and configured for connection with an external electrical power supply to supply at least the data processing unit with external electrical energy;

a rechargeable battery store disposed within the housing, the rechargeable battery store for storing electrical energy at least for the data processing unit;

a user interface at least partly conformed on the housing, the user interface being in communication connection with data processing unit to enable user interaction;

wherein the user interface includes a display device provided on the housing, wherein the display device displays at least one parameter including a communication connection with the at least one external peripheral component; and wherein the computer program product, when executed by the data processing unit, is configured to control communication of the data processing unit with the at least one external peripheral component having the communication connection from the plurality of connectable external peripheral components.

2. The device according to claim 1, wherein the display device is configured to display at least one further parameter that includes one or more of
a communication connection of the device or the data processing unit with an external network;
a current charge state of the rechargeable battery store; and
a network connection between the device and an external network.

3. The device according to claim 1, wherein the user interface includes an input arrangement provided on the housing, the device is configured to be controlled by the user via the input arrangement.

4. The device according to claim 3, wherein the input arrangement includes at least one actuation element that is configurable by the user such that in accordance with the actuation element being actuated, an input signal is generated that can be transmitted to the data processing unit from the input arrangement.

5. The device according to claim 1, wherein the at least one wireless communication interface includes at least one of a WLAN and a Bluetooth interface; and
the wired communication interface includes an Ethernet interface.

6. The device according to claim 1, wherein the computer program product, when executed by the data processing unit, is configured to prioritize communication of the data processing unit with the at least one external peripheral component having the communication connection over disconnected peripheral components of the plurality of connectable external peripheral connections.

7. An assembly, comprising:
the device according to claim 1; and
at least one peripheral component in communication connection with the data processing unit via the wireless communication interface or via the wired communication interface.

8. The assembly according to claim 7, including a stationary data processing system configured for connection with the device for transmitting data.

9. The assembly according to claim 8, wherein the at least one peripheral component includes at least one of the following:
an autonomous or non-autonomous display;
a smart glass;
a smartwatch;
a camera;
a loudspeaker;
an audio-oral system;
a sensor system with at least one sensor for capturing sensor data;
an antenna; and
an energy harvesting system.

10. The device according to claim 1, wherein
the display device displays at least one further parameter including an operating state of the data processing unit.

11. A device, comprising:
a housing;
a data processing unit configured to run a computer program product;
at least one wireless communication interface communicatively coupled with the data processing unit to establish a wireless communication connection between the data processing unit and one or more of a plurality of external peripheral components;
at least one wired communication interface communicatively coupled with the data processing unit to establish a wired communication connection between the data processing unit and one or more of a plurality of external peripheral components or an external network;
a supply connection configured for connection with an external electrical power supply to supply at least the data processing unit with external electrical energy;
a rechargeable battery store for storing electrical energy at least for the data processing unit;
a user interface at least partly conformed on a housing of the device, the user interface being in communication connection with data processing unit to enable user interaction
wherein the user interface includes a display device that displays at least one parameter including a communication connection with the one or more of the plurality of external peripheral components; and
wherein the computer program product, when executed by the data processing unit, is configured to control communication of the data processing unit with the one or more of the plurality of external peripheral components having the communication connection.

12. The device according to claim 11, wherein the display device is configured to display at least one further parameter that includes one or more:
a communication connection of the device or the data processing unit with an external network;
a current charge state of the rechargeable battery store; and a network connection between the device and an external network.

13. The device according to claim 11, wherein the user interface includes an input arrangement provided on the housing, the device is configured to be controlled by the user via the input arrangement.

14. The device according to claim 13, wherein the input arrangement includes at least one actuation element that is configurable by the user such that in accordance with the actuation element being actuated, an input signal is generated that can be transmitted to the data processing unit from the input arrangement.

15. The device according to claim 11, wherein the at least one wireless communication interface includes at least one of a WLAN and a Bluetooth interface; and the wired communication interface includes an Ethernet interface.

16. The device according to claim 11, wherein the computer program product, when executed by the data processing unit, is configured to prioritize communication of the data processing unit with the one or more of the plurality of external peripheral components having the communication connection over other disconnected peripheral components.

* * * * *